(12) United States Patent
Krishnakumar

(10) Patent No.: US 9,848,177 B2
(45) Date of Patent: *Dec. 19, 2017

(54) HYBRID LIGHT ENGINE FOR PROJECTOR

(71) Applicant: DELL PRODUCTS, LP, Round Rock, TX (US)

(72) Inventor: Karthikeyan Krishnakumar, Round Rock, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/098,465

(22) Filed: Apr. 14, 2016

(65) Prior Publication Data

US 2016/0227178 A1   Aug. 4, 2016

Related U.S. Application Data

(63) Continuation of application No. 14/064,751, filed on Oct. 28, 2013, now Pat. No. 9,329,461.

(51) Int. Cl.
| | |
|---|---|
| *H04N 9/31* | (2006.01) |
| *G03B 21/00* | (2006.01) |
| *G03B 21/20* | (2006.01) |
| *G03B 33/06* | (2006.01) |
| *G03B 33/08* | (2006.01) |
| *G02B 26/00* | (2006.01) |
| *G02B 26/08* | (2006.01) |

(52) U.S. Cl.
CPC ......... *H04N 9/3111* (2013.01); *G02B 26/008* (2013.01); *G02B 26/0816* (2013.01); *G03B 21/008* (2013.01); *G03B 21/2013* (2013.01); *G03B 21/2033* (2013.01); *G03B 33/06* (2013.01); *G03B 33/08* (2013.01); *H04N 9/3114* (2013.01); *H04N 9/3158* (2013.01); *H04N 9/3161* (2013.01); *H04N 9/3164* (2013.01)

(58) Field of Classification Search
CPC .... G03B 21/14; G03B 21/204; H04N 9/3114; H04N 9/3161
See application file for complete search history.

(56) References Cited

U.S. PATENT DOCUMENTS

| | | | |
|---|---|---|---|
| 6,409,349 | B1 | 6/2002 | O'Connor |
| 7,261,423 | B2 | 8/2007 | Magarill et al. |
| 7,449,667 | B2 | 11/2008 | Li et al. |
| 7,766,490 | B2 | 8/2010 | Harbers et al. |
| 7,972,001 | B2 | 7/2011 | Penn et al. |
| 2002/0154277 | A1 | 10/2002 | Mukawa et al. |
| 2005/0219475 | A1 | 10/2005 | Mihara |

(Continued)

*Primary Examiner* — Sultan Chowdhury
(74) *Attorney, Agent, or Firm* — Larson Newman, LLP

(57) ABSTRACT

A projector includes a light source, a filter unit, an auxiliary light source and a combiner. The light source produces a first beam of light having light in a plurality of ranges of wavelengths, corresponding to a plurality of colors. The filter unit is positioned in the optical path of the first light beam. The filter unit is configured in a first configuration during a first time interval and in a second configuration during a second time interval. When the filter unit is configured in the second configuration, the auxiliary light source produces a second beam of light. The combiner combines the first beam of light and the second beam of light. The combined beams of light are directed to a spatial light modulator.

16 Claims, 12 Drawing Sheets

(56) References Cited

U.S. PATENT DOCUMENTS

| | | |
|---|---|---|
| 2006/0132403 A1 | 6/2006 | Maximus et al. |
| 2006/0279710 A1 | 12/2006 | Tani |
| 2007/0146641 A1 | 6/2007 | Wang |
| 2008/0297666 A1 | 12/2008 | Hoffman |
| 2009/0153752 A1 | 6/2009 | Silverstein |
| 2010/0328614 A1 | 12/2010 | Ikeda et al. |
| 2011/0194038 A1* | 8/2011 | Kimura ............... H04N 9/315 349/7 |
| 2012/0081672 A1 | 4/2012 | Okuda et al. |
| 2013/0100417 A1* | 4/2013 | Yang ................ G03B 21/204 353/31 |
| 2013/0278902 A1* | 10/2013 | Chen ................ G03B 21/204 353/31 |

\* cited by examiner

HYBRID LIGHT ENGINE FOR PROJECTOR

CROSS REFERENCE TO RELATED APPLICATION

This application is a continuation of U.S. patent application Ser. No. 14/064,751, entitled "Hybrid Light Engine for Projector," filed on Oct. 28, 2013, the disclosure of which is hereby expressly incorporated by reference in its entirety.

FIELD OF THE DISCLOSURE

The present disclosure generally relates to information handling systems, and more particularly relates to image projectors for information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, networking systems, and data storage systems.

An information handling system in a particular installation may use one or more projectors.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Figure 1:
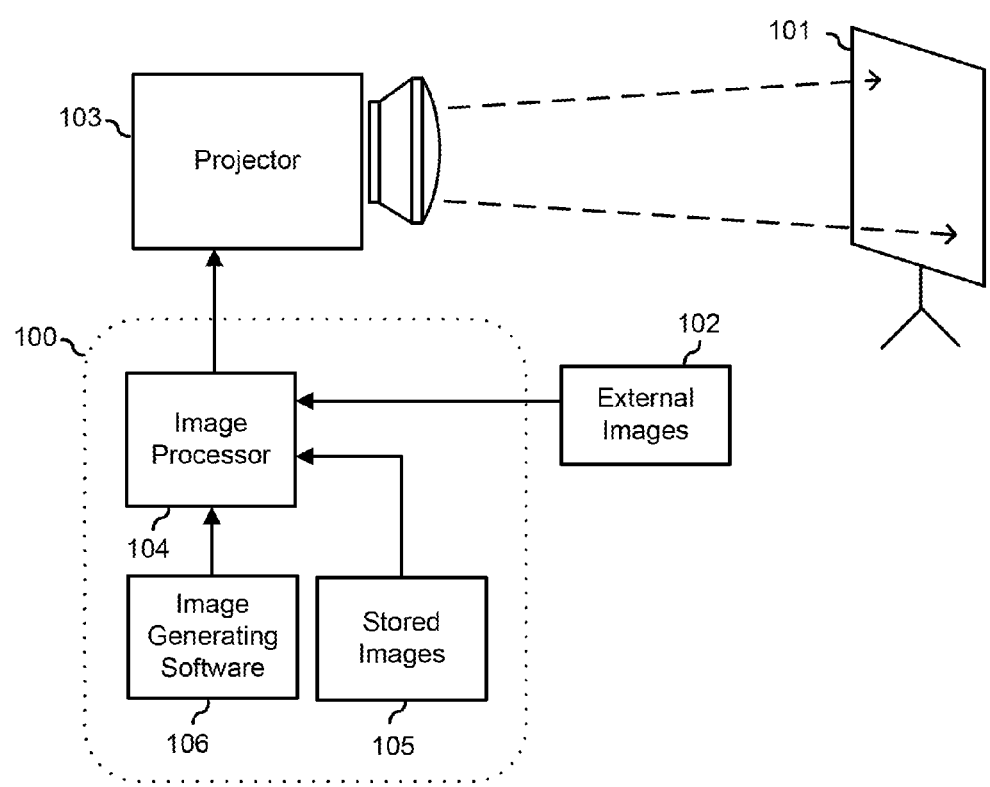
FIG. 1 is a diagram of a system for projecting images according to an embodiment of the present disclosure.

FIG. 1 shows a diagram of a system including information handling system 100, screen 101, external images 102 and projector 103. Information handling system 100 includes image processor 104, stored images 105 and image generating software 106. Image processor 104 is coupled to projector 103 and to a plurality of image sources. Image sources include external images 102, stored images 105 and image generating software 106. Image processor 104 receives image data from image sources and converts the image data to an input format of projector 103. Projector 103 projects representations of images onto screen 101.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

In various embodiments of the present disclosure, image processor 104 can be hardware, software or a combination thereof. In an embodiment, image processor 104 can include a graphics chip capable of rendering images for projection. In an embodiment, image processor 104 can include software executable on a CPU. In an embodiment, image processor 104 can receive image data representing an image of a user interface of a program. For example, information handling system 100 can be a laptop computer. The laptop computer can show a user interface on a built-in display screen of the laptop computer and simultaneously have the user interface projected onto screen 101 using projector 103. In various embodiments, image generating software 106 can include presentation software, video playback software, still image display software, game software, desktop display software, combinations thereof and the like. For example, a presentation to be projected can be prepared using presentation creation software.

In embodiments, image processor 104 can render images obtained from stored images 105 and from external images 102. Images can include a related series of images that are projected in sequence. For example, stored images 105 can include a series of images downloaded from an online movie provider for projection as a movie. External images 102 can be a series of images streamed from an online provider of video clips. In an embodiment, images are individual still images. For example, stored images 105 can include images that have been uploaded to information handling system 100 from a camera or from a smartphone.

In an embodiment of the present disclosure, projector 103 produces a light beam using a light source. The light beam is directed through an optical path. A filter can be positioned in the optical path. The filter can remove wavelengths of light except those corresponding to a first primary color. The light beam of the first primary color can be directed onto a spatial image modulator that further directs portions of the light beam through projection optics to a screen. The portions of light that are directed to the screen represent pixels of the first primary color in an image. After a time interval, a filter of a second primary color can be placed into the light beam and the spatial image modulator can direct different portions of the light beam through the projection optics to the screen. In an embodiment, a projector producing light using a lamp as a primary light source can be designed for improved color performance at the expense of image brightness, or for improved image brightness at the expense of color performance. A beam of light produced by a high power lamp can have light in a wide range of visible wavelengths. Producing primary colors by filtering a beam of light reduces the intensity of much of the light produced by the lamp. In embodiments, a beam of filtered light produced by a primary light source can be combined with light from an auxiliary light source before being directed onto a spatial light modulator.

The term "color" as used herein refers to ranges of wavelengths of light. For example, light having wavelengths in a range from approximately 620 nm to approximately 750 nm can be described as red, while light having wavelengths in a range from approximately 450 nm to approximately 495 nm can be described as blue. A light beam described herein as having a particular color is to be understood as having higher intensity at wavelengths of light in a range corresponding to the particular color, however the light beam can include light at a lower intensity having wavelengths outside of the range corresponding to the particular color. For example, a red beam of light includes light having wavelengths in a range corresponding to the color red and can also include light having wavelengths in a range corresponding to the color blue, however light in the blue range will be less intense than light in the red range such that the light in the blue range will not be perceivable by a person viewing the beam of light.

The term "filter" as used herein refers to a device that changes the spectrum of a beam of light by reducing the intensity of light of particular wavelengths. A filter can be described by a range or ranges of wavelengths of light that it does not reduce in intensity. A range of wavelengths can be described as a color as discussed previously. For example, a filter can be described as a "red filter." A red filter reduces the intensity of light having wavelengths corresponding to the color red by a relatively small amount, while reducing the intensity of light having wavelengths corresponding to other colors by a relatively large amount. A filter can reduce the intensity of all wavelengths of visible light by a relatively large amount. Such a filter is described herein as "opaque," as an opaque filter or as a black filter. A filter can reduce the intensity of all wavelengths of visible light by a relatively small amount. Such a filter is described herein as "transparent" or as a white filter. The term "filtering" as used herein refers to the process of reducing the intensity of light in particular ranges of wavelengths. A beam of light having passed through a filter can be described as having been "filtered."

Figure 2:
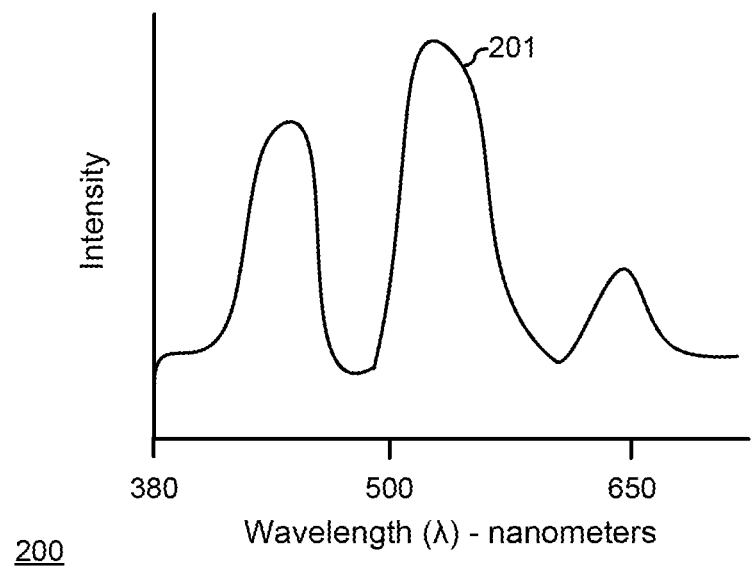
FIGS. 2 and 3 are graphs of light spectra according to an embodiment of the present disclosure.
Figure 2:
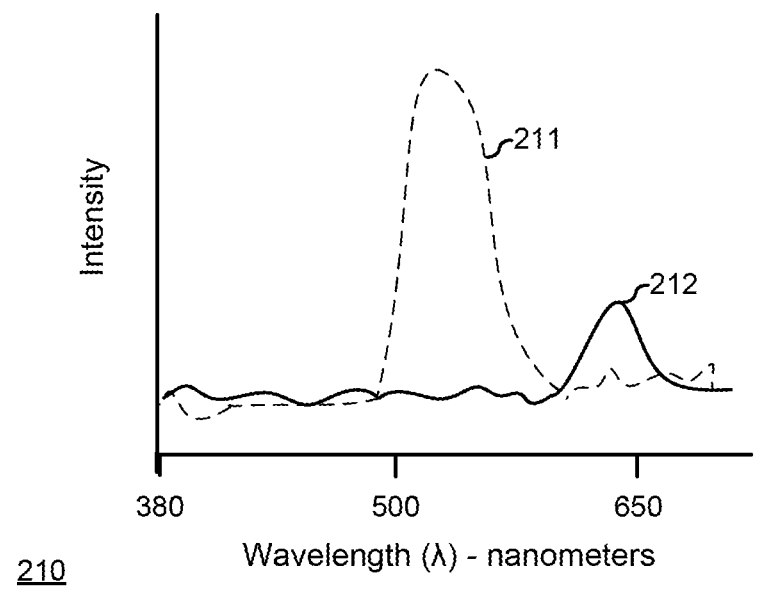

FIG. 2 shows a graph 200 of a spectrum 201 of light produced by a primary light source in a projector. The horizontal axis represents wavelengths of light produced by the primary light source. The vertical axis represents the intensity of light. Spectrum 201 has three peaks. The peak between wavelengths 380 nm and 500 nm represents blue light. The peak between 500 nm and 650 nm represents green light. The peak at 650 nm represents red light. In an embodiment, a projector uses filters to remove colors of light except for a single primary color from light produced by a primary light source. The result of filtering light from a primary light source is illustrated at graph 210.

Graph 210 shows two spectra produced by filtering light from a primary light source. The horizontal axis represents wavelengths of light in a light beam after passing through a filter. The vertical axis represents the intensity of light. Spectrum 211 shows the spectrum of light from the primary light source after passing through a green filter. The green filter reduces the intensity of light having wavelengths less than approximately 500 nm and above approximately 600 nm. The primary light source of the present example produces a relatively high intensity of green light, thus the light beam after passing through the green filter is relatively bright. Spectrum 212 shows the spectrum of light from the primary light source after passing through a red filter. The red filter reduces the intensity of light having wavelengths less than approximately 600 nm. The primary light source produces a relatively low intensity of red light, thus the light beam after passing through the red filter is relatively dim. In an embodiment of the present invention, light from an auxiliary light source having a spectrum similar to the spectrum of a filtered light beam can be combined with the filtered light beam.

Figure 3:
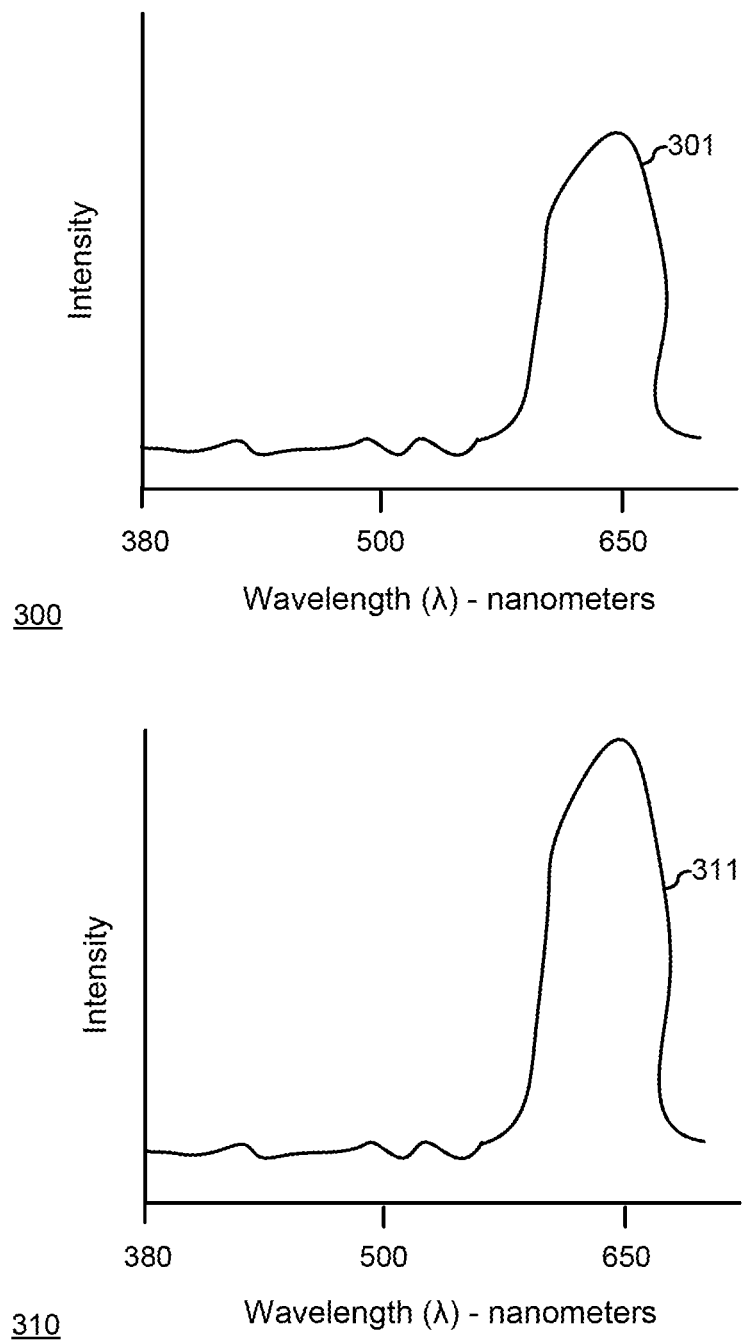

FIG. 3 shows a graph 300 of a spectrum 301 of an auxiliary light source. The horizontal axis represents wavelengths of light in a light beam produced by the auxiliary light source. The vertical axis represents the intensity of light. The auxiliary light source can produce a light beam having a high intensity at wavelengths of approximately 650 nm, corresponding to red light. Similar to spectrum 212, spectrum 301 shows light from the auxiliary light source having low intensity at wavelengths corresponding to colors other than red. Light from the auxiliary light source can be combined with filtered light from a primary light source to produce a more intense beam of red light. Graph 310 shows a spectrum 311 of a combined beam of light. The beam of light represented by spectrum 311 is obtained by combining filtered light, represented by spectrum 211, with light produced by an auxiliary light source, represented by spectrum 301. In an embodiment, a combined light beam represented by spectrum 311 can be directed through an optical path to a spatial light multiplexer. In an embodiment, light from auxiliary light sources having colors other than red can be combined with filtered light. For example, light from a primary light source can be filtered using a blue filter and the filtered light can be combined with light from an auxiliary light source producing blue light. In a similar fashion, a green filter can be used in combination with an auxiliary light source producing green light. In an embodiment, an auxiliary light source can include a light emitting diode (LED). In an embodiment, an auxiliary light source can include a laser diode.

It will be appreciated by those skilled in the art that the graphs at FIGS. 2 and 3 have been simplified for clarity and are representative of the spectra of light produced using primary light sources, auxiliary light sources and filters. The graphs do not represent the intensity curves of any particular device. For example, a primary light source used in a projector can produce light having a more uniform spectrum with peaks that are less distinct than shown at spectrum 201. In another example, an auxiliary light source can produce light having a spectrum with a sharper peak than that shown at spectrum 301.

Figure 4:
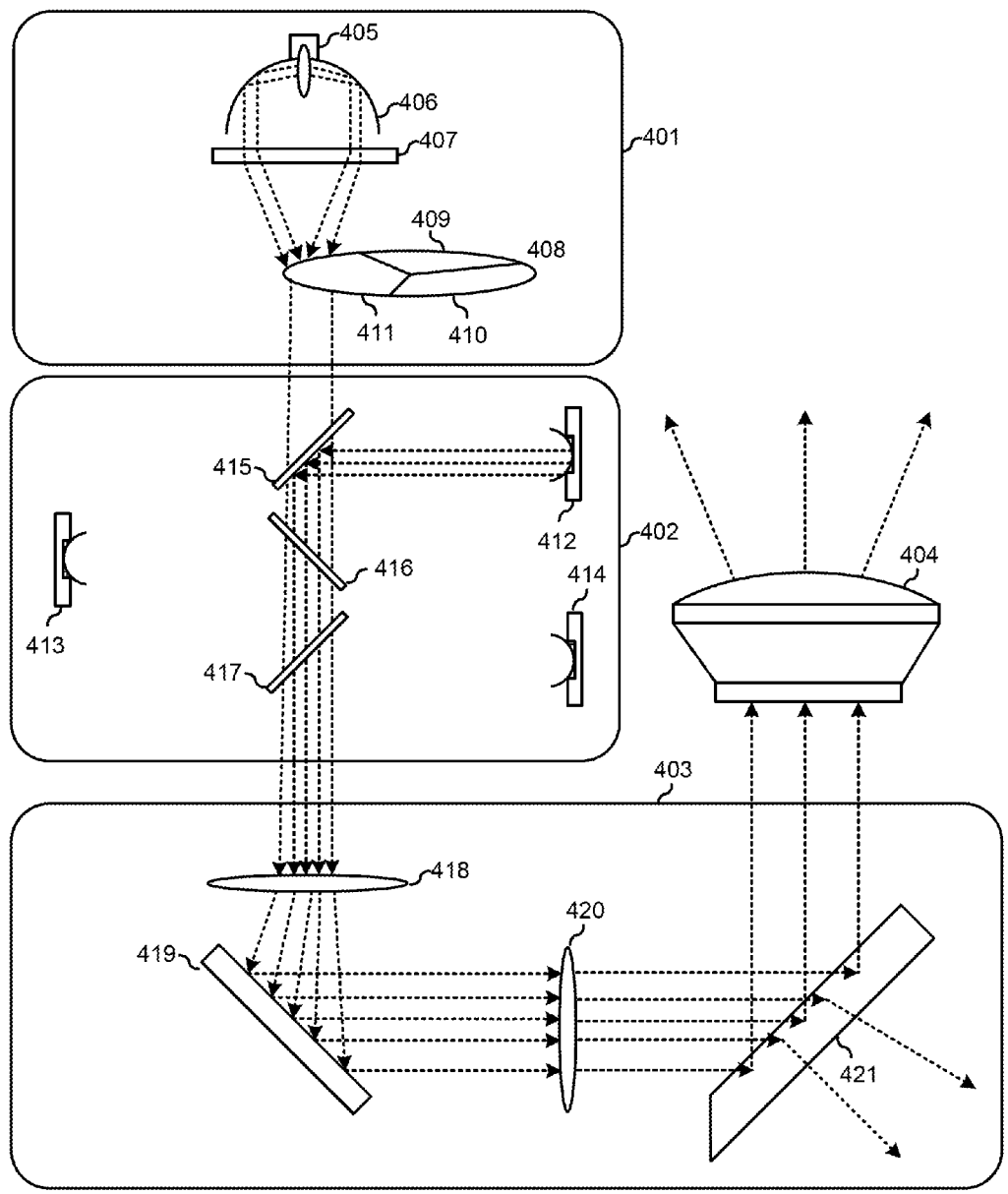
FIG. 4 is a diagram of a projector according to an embodiment of the present disclosure.

FIG. 4 is diagram of a projector 400 having three auxiliary light sources to augment light produced by a projector using a lamp as a primary light source. Projector 400 includes lamp module 401, auxiliary light source module 402, projection optics module 403 and projector lens assembly 404. Lamp module 401 includes a lamp 405, a reflector 406, a lens 407 and a color wheel 408. Lamp 405 can be of any type suitable for projecting images. In various embodiments, lamp 405 can be a metal halide lamp, a mercury lamp, an ultra high performance lamp (UHP), a light emitting diode, a fluorescent lamp, a combination thereof, or the like. Lamp 405 is partially surrounded by reflector 406. Lamp 405 produces light having a spectrum. The spectrum produced by lamp 405 is characteristic of a particular type of lamp. As discussed with respect to FIG. 2 a spectrum of light produced by a light source in a projector can include a plurality of peaks. In an embodiment, the plurality of peaks corresponds to a plurality of colors. In an embodiment, a spectrum has peaks corresponding to the primary colors red, green and blue.

Light from lamp 405 is directed through lens 407 onto color wheel 408. Color wheel 408 includes filter sections 409, 410 and 411. During operation of the projector 400, color wheel 408 rotates. Each rotation successively places each one of filter sections 409-411 in an optical path of the light produced by lamp 405 for a time interval. During the time interval in which a filter section is positioned in the optical path, the filter section filters light produced by lamp 405 to produce a filtered light beam having a color corresponding to the respective filter section. In an embodiment, each filter section 409-411 of color wheel 408 reduces the intensity of light in a range of wavelengths other than a range of wavelengths corresponding to the color of the respective filter section. For example, filter section 411 can be a red filter. The filter section 411 reduces the intensity of wavelengths of light in the light beam, other than wavelengths corresponding to red light, as discussed with respect to spectrum 212. Color wheel 408 is illustrated as having three filter sections. More or fewer filter sections can be used in embodiments of the present disclosure. In an embodiment, a color wheel has two sections. In various embodiments, a color wheel has more than three sections. In an embodiment, more than one filter section of a color wheel has a particular color. In an embodiment, a filter section of a color wheel is transparent.

Auxiliary light source module 402 includes auxiliary light sources 412-414 and beam combiners 415-417. Auxiliary light sources 412-414 produce light which can be combined with light produced by lamp 405. In an embodiment, each one of auxiliary light sources 412-414 produces light of a single primary color. For example, auxiliary light source 412 can produce red light, auxiliary light source 413 can produce green light and auxiliary light source 414 can produce blue light. FIG. 4 illustrates auxiliary light module 402 having three auxiliary light sources. In an embodiment, an auxiliary light module can have fewer than three auxiliary light sources. For example, an auxiliary light module can have a first auxiliary light source to produce blue light and a second auxiliary light source to produce red light. Auxiliary light sources 412-414 can be any light source capable of producing light primarily of a single color. In an embodiment, auxiliary light sources 412-414 include light emitting diodes. In an embodiment, auxiliary light sources 412-414 include laser diodes.

During operation of projector 400, auxiliary light sources 412-414 produce light intermittently. Each auxiliary light source 412-414 produces light only when a filter section in a particular subset of filter sections 409-411 is positioned in a light beam produced by lamp 405. In an embodiment, an auxiliary light source 412-414 produces light only when a filter segment 409-411 having a color similar to a color of light produced by the auxiliary light source is positioned in the light beam produced by lamp 405. For example, auxiliary light source 412 can produce red light during a time interval that a red filter segment 411 is positioned in the light beam. In response to red filter segment 411 rotating out of the light beam and blue filter segment 410 rotating into the light beam, auxiliary light source 412 can stop producing red light.

Beam combiners 415-417 combine the beam of light produced by lamp 405, as filtered by the filter segments 409-411 of color wheel 408, with light produced by auxiliary light sources 412-414. Beam combiners 415-417 are positioned in an optical path of a beam of light produced by lamp 405. Light produced by lamp 405 passes through beam combiners 415-417 in the optical path. Beam combiners 415-417 can reflect light produced by auxiliary light sources 412-414, respectively, into the optical path of the light produced by lamp 405. Beam combiners 415-417 can be any device known in the art suitable for combining beams of visible light. In an embodiment, beam combiners 415-417 are dichroic mirrors.

Projection optics module 403 includes lenses 418 and 420, mirror 419, and spatial image modulator 421. Lens 418, mirror 419 and lens 420 focus and direct the light beam produced by lamp 405, as filtered by color wheel 408 and augmented by light from auxiliary light sources 412-414, onto spatial light modulator 421. Those skilled in the art will appreciate that the particular optical elements shown at FIG. 4 can be replaced with other optical elements performing a similar function. The selection of optical elements can be influenced by factors such as a shape of a physical enclosure for the projector, a desired size of the projector, and illumination requirements for a particular spatial light modulator employed. Spatial light modulator 421 selectively directs portions of light directed onto it through projector lens assembly 404. In an embodiment, spatial light modulator 421 includes sections corresponding to pixels of an image. In an embodiment, a section corresponding to a pixel can be oriented to reflect light through projector lens assembly 404 or to reflect light away from projector lens assembly 404. In an embodiment, the spatial light modulator 421 reflects light using a plurality of movable mirrors. Each mirror of the plurality of movable mirrors can have a first position reflecting light into projection lens assembly 404 and a second position reflecting light away from projection lens assembly 404. In another embodiment, not shown, a light beam can pass through a spatial light modulator. Sections of the spatial light modulator corresponding to pixels can be opaque or transparent. A transparent section allows light to pass through into the projector lens assembly.

Projector 400 operates by directing a light beam from lamp 405 through color wheel 408. Color wheel 408 rotates to position one of filter sections 409-411 in the path of the light beam. Each of filter sections 409-411 can modify a spectrum of the light beam by reducing the intensity of wavelengths of light in a range or ranges of wavelengths. After passing through the color wheel 408, the light beam enters auxiliary light source module 402. In response to particular filters being positioned in the light beam, the projector turns on one or more of auxiliary light sources 412-415. Beam combiners 415-417 combine light generated by auxiliary light sources 412-414, respectively, with the light beam generated by lamp 405. At FIG. 4, auxiliary light source 412 is illustrated as generating an auxiliary light beam. Beam combiner 415 combines light from auxiliary light source 412 with the light beam produced by the lamp 405. For example, filter section 411 can be a red filter and auxiliary light source 412 can produce red light. The light beam exiting beam combiner 415 contains red light generated by lamp 405 and red light generated by red auxiliary light source 412.

After exiting the auxiliary light source module 402, the light beam enters projection optics module 403 and is directed onto spatial light modulator 421. Spatial light modulator 421 can have sections corresponding to pixels of an image to be projected. Sections corresponding to pixels that are to be illuminated in a projected image direct light through projection lens assembly 404. Sections corresponding to pixels that are not to be illuminated direct light away from projection lens assembly 404.

In an embodiment, control logic (not shown) coordinates timing of the color wheel 408, auxiliary light sources 412-414, and spatial light modulator 421. In an embodiment, control logic detects that a red filter section of color wheel 408 is positioned in the light beam from lamp 405. In response to detecting a red filter the control logic turns on a red auxiliary light source. For example, auxiliary light source 412 can be turned on. Control logic also configures spatial light modulator 421 to direct light for pixels that are to be illuminated with red light into projection lens assembly 404. As color wheel 408 rotates, a second filter section is positioned in the light beam. In an embodiment, the second filter section can be blue. In response to detecting a blue filter, control logic can turn off the red auxiliary light source, turn on a blue auxiliary light source and configure the spatial light modulator to direct light for pixels that are to be blue into projection lens assembly 404. In an embodiment, control logic can detect filter sections, turn on auxiliary light sources and configure spatial light modulator 421 for additional colors. In other embodiments, one of auxiliary light sources 412-414 having a first color can be turned on in response to a filter section of color wheel 408 having a second color being positioned in a light beam from lamp 405. In an embodiment, an auxiliary light source can be turned on in response to a transparent filter being positioned in a light beam from lamp 405. In an embodiment, an auxiliary light source can be turned on at less than full power. In an embodiment, an auxiliary light source can be turned on at 50% of full power.

In an embodiment of the present disclosure, the use of auxiliary light sources in addition to a lamp can be a selectable option. Use of auxiliary light sources can be selected, for example, by a switch on a projector or by a control program executing on an information handling system coupled to the projector. In an embodiment, the use of individual auxiliary light sources can be a selectable option. For example, the use of a red auxiliary light source can be enabled and the use of a blue auxiliary light source can be disabled. In an embodiment, auxiliary light source module 402 can be removed from an optical path of a light beam from lamp 405. For example, a projector can have a lever which, when operated, retracts the auxiliary light source module 402 from the optical path. In an embodiment, the beam combiners can be removed from an optical path of a light beam from lamp 405.

Those skilled in the art will appreciate that color wheel 408 can rotate rapidly to position multiple filter sections per second in a light beam from lamp 405, that auxiliary light sources 412-414 can be turned on and off multiple times per second, and that positions of sections of spatial light modulator 421 can be positioned multiple times per second. Skilled practitioners will also appreciate that techniques well known in the art for creating colors other than the colors on a color wheel can be used with the disclosed apparatus. For example, when color wheel 408 contains only primary colors a projector can project a pixel having a secondary color by illuminating the pixel with more than one primary color in rapid succession. A yellow pixel can be projected by having the section of the spatial light modulator 421 corresponding to the pixel direct both red light and green light into the projection lens assembly 404.

Figure 5:
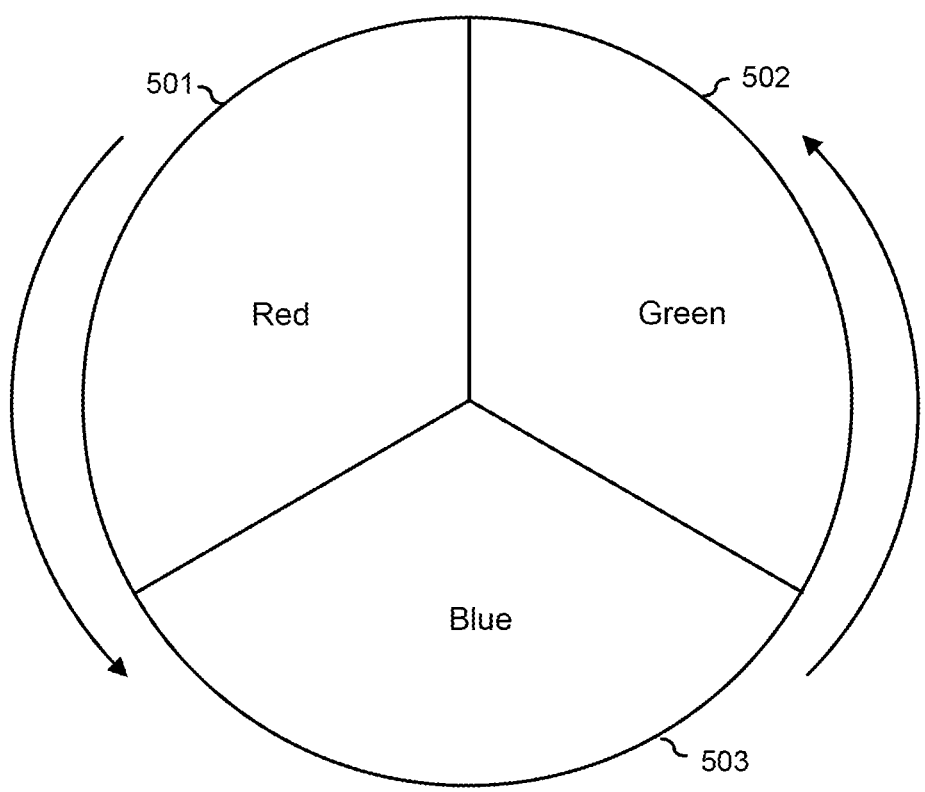
FIG. 5 is a diagram of a color wheel according to an embodiment of the present disclosure.

FIG. 5 shows a layout of filter sections for a color wheel 500. Color wheel 500 includes three filter sections. Filter section 501 is a red section, filter section 502 is a green section, and filter section 503 is a blue section. Color wheel 500 rotates as indicated by the arrows. Each of filter sections 501-503 reduces the intensity of one or more ranges of wavelengths of visible light. In an embodiment, filter section 501 can reduce the intensity of light having wavelengths outside of a range of approximately 620 nm to approximately 750 nm. Although filter section 501 can reduce the intensity of light within the range, the reduction in intensity of light having wavelengths within the range is less than the reduction in intensity of light having wavelengths outside of the range. In an embodiment, filter section 502 can reduce the intensity of light having wavelengths outside of a range of approximately 495 nm to approximately 570 nm. The range corresponds to green light. Similar to filter section 501, filter section 502 can reduce the intensity of light within the range while primarily reducing the intensity of light outside the range. In an embodiment, filter section 503 can reduce the intensity of light having wavelengths outside of a range of approximately 450 nm to approximately 495 nm. The range corresponds to blue light. Similar to filter section 501, filter section 503 can reduce the intensity of light within the range while primarily reducing the intensity of light outside the range. In embodiments, other ranges of wavelengths can correspond to particular colors.

Figure 6:
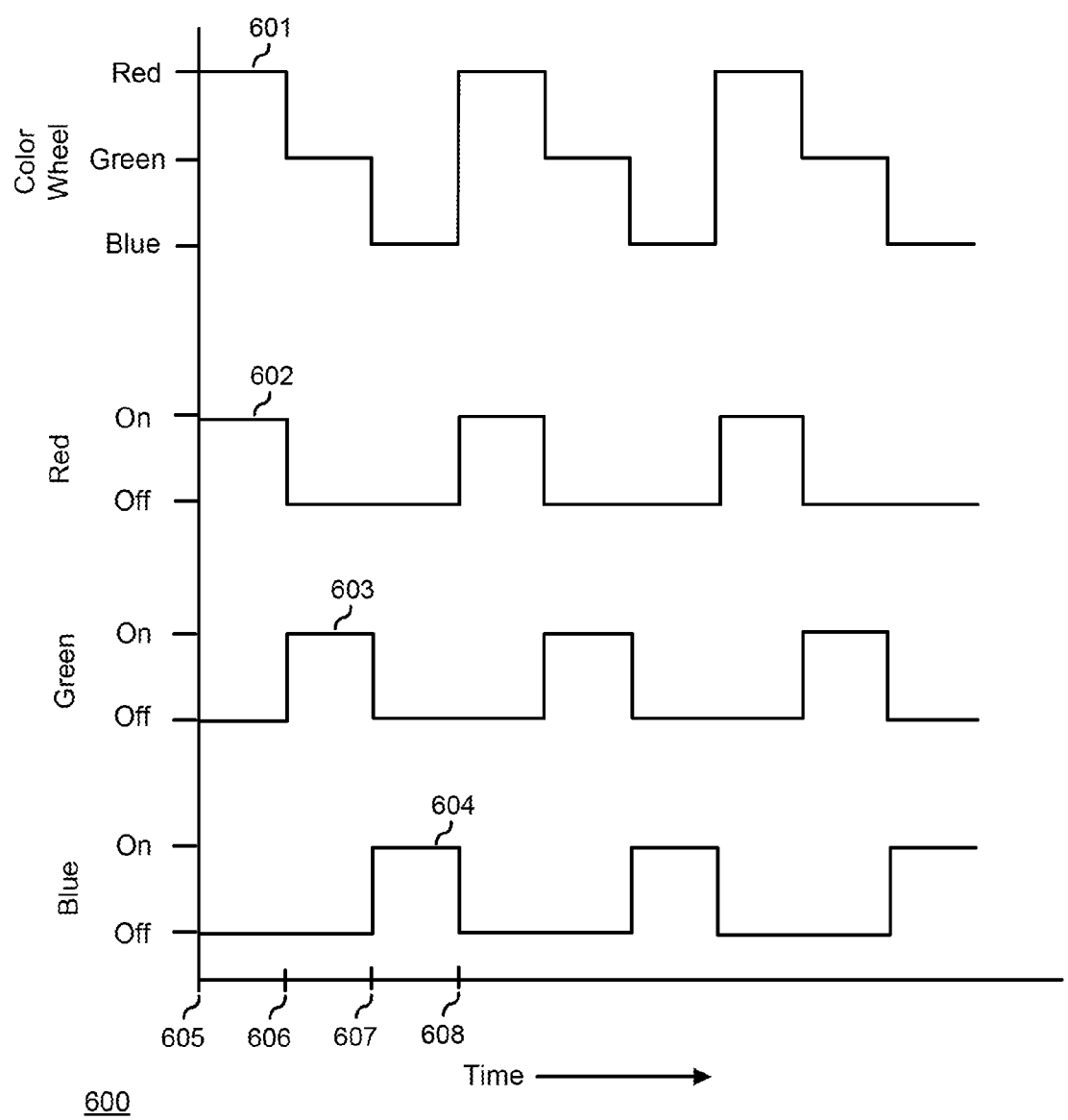
FIG. 6 is a timing diagram according to an embodiment of the present disclosure.

FIG. 6 shows timing diagram 600 illustrating the operation of projector 400 using color wheel 500. The horizontal axis represents time. Color wheel timing curve 601 indicates which filter of filter sections 501-503 is positioned in the light beam from lamp 405 during a time interval. Timing curves 602-604 indicate the states of auxiliary light sources 312-314, respectively. Color wheel 500 rotates. As it rotates filter sections 501-503 are successively positioned in the light beam once on each rotation. Auxiliary light source timing curves 602-604 indicate the state of auxiliary light sources 412-414 as on or off. At time 605, red filter section 501 is positioned in the light beam from lamp 405 and a red auxiliary light source 412 is turned on. Green auxiliary light source 413 and blue auxiliary light source 414 are turned off. At time 606, green filter section 502 is positioned in the light beam. Red auxiliary light source 412 is turned off and green auxiliary light source 413 is turned on. At time 607, blue filter section 503 is positioned in the light beam. Green auxiliary light source 413 is turned off and blue auxiliary light source 414 is turned on. At time 608, red filter section 501 is again positioned in the light beam as the color wheel rotates and the sequence repeats.

It will be appreciated by those skilled in the art that the ordering of colors on the color wheel 500 is arbitrary. A different ordering of colors can be used with appropriate modifications to the timing of auxiliary light sources. As illustrated at FIG. 5, filter sections of color wheel 500 are the same size. In embodiments of the present disclosure, filter sections of a color wheel have different sizes. For example, in a color wheel having three filter sections a red filter section can be twice as large as blue and green filter sections.

Figure 7:
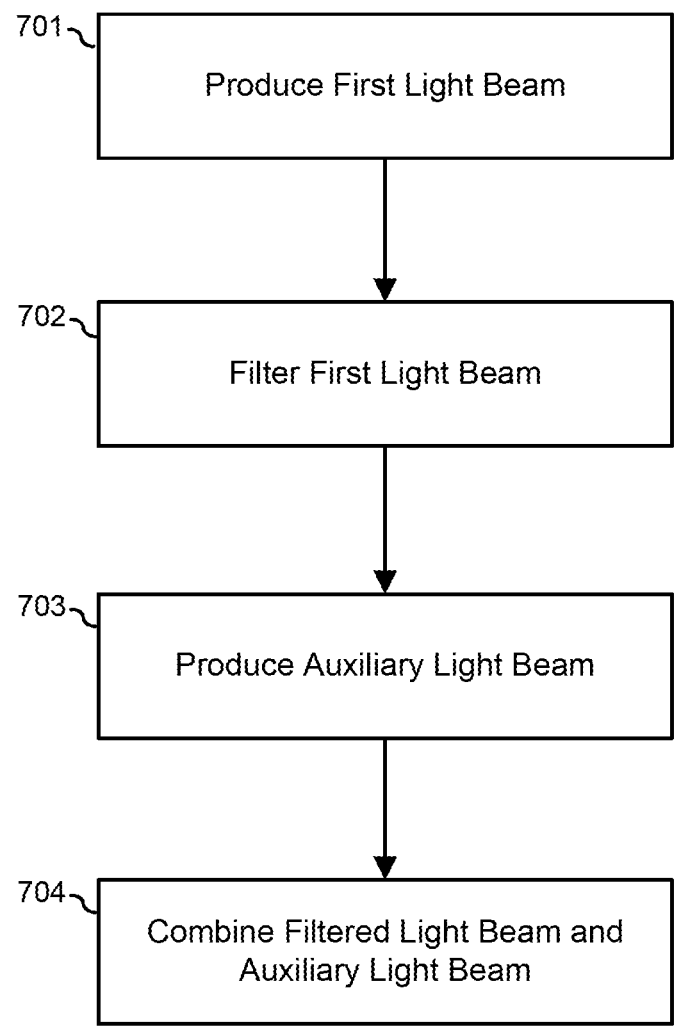
FIG. 7 is a flow diagram of a method for operating a projector according to an embodiment of the present disclosure.

FIG. 7 shows flow diagram 700 of a method for producing a combined light beam in a projector. At step 701, a first light beam is produced. The first light beam can be produced by a light source as described with respect to lamp 405. At step 702, the first light beam is filtered. In an embodiment, the first light beam is filtered as described with respect to color wheel 408. In an embodiment, the light beam is filtered to create a light beam having a single primary color corresponding to a range of wavelengths of light. In an embodiment, the light beam is filtered to create a light beam having a color other than a primary color. At step 703, an auxiliary light beam is produced. In an embodiment, the auxiliary light beam and the filtered first light beam have spectra with the greatest intensity of light in a first range of wavelengths. In an embodiment, the auxiliary light beam is produced only when the light beam is filtered in a particular manner at step 702. In an embodiment, the auxiliary light beam can be produced only when the first beam is filtered by a particular filter section of a color wheel. At step 704, the filtered first light beam and the auxiliary light beam are combined. In an embodiment, the beams are combined using a dichroic mirror.

Figure 8:
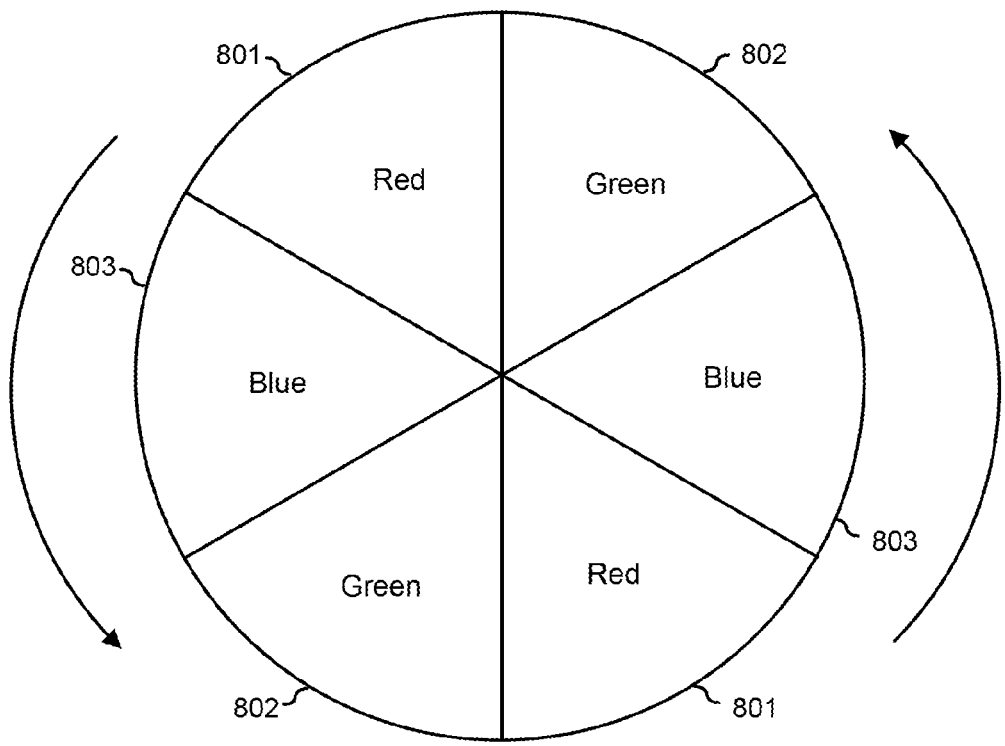
FIG. 8 is another diagram of a color wheel according to an embodiment of the present disclosure.

FIG. 8 shows a color wheel 800 including filter sections 801-803. Color wheel 800 includes two filter sections of each primary color. Filter sections 801 are red, filter sections 802 are green and filter sections 803 are blue. Similar to filter sections 501-503, each filter of filter sections 801-803 reduces the intensity of light in one or more ranges of wavelengths. Color wheel 800 rotates as indicated by the arrows. The rotation of color wheel 800 positions each filter section of filter sections 801-803 in the path of a light beam of a lamp once during each rotation of color wheel 800. Similar to color wheel 500, in response to a particular filter being positioned in the light beam a projector turns on an auxiliary light source having a color similar to the color of the filter. Color wheel 800 includes filter sections having the same colors in the same sequence as color wheel 500, thus timing diagram 600 illustrates the coordination of filter sections and auxiliary light sources for both color wheel 500 and color wheel 800.

In an embodiment, different primary colors can have different numbers of filter sections in a color wheel. For example, a color wheel can have three red sections, two blue sections and one green section. It will be apparent to those skilled in the art to modify the timing illustrated at FIG. 6 for turning auxiliary light sources on and off with the appropriate filter sections.

Figure 9:
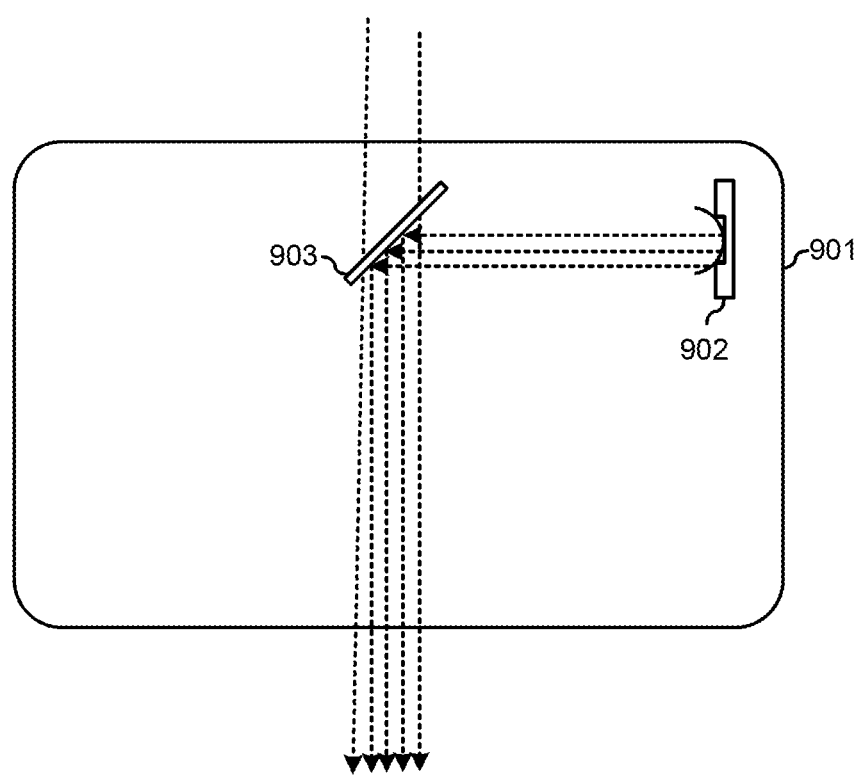
FIG. 9 is a diagram of an auxiliary light module according to an embodiment of the present disclosure.

FIG. 9 shows an auxiliary light module 901. Auxiliary light module 901 can be used in place of auxiliary light module 402 in embodiments of the present disclosure. Auxiliary light module 901 includes red auxiliary light source 902 and beam combiner 903. Similar to auxiliary light module 402, a filtered beam of light produced by a lamp enters auxiliary light module 901. Red auxiliary light module 901 can produce a beam of red light using red auxiliary light source 902, and can combine the beam of red light with the filtered beam of light using beam combiner 903. The filtered beam of light exits auxiliary light module 901 and can be directed to a projection optics module. Red auxiliary light source 902 produces light having higher intensity in a range of wavelengths corresponding to the color red and having lower intensity outside the range of wavelengths. Control circuitry, not shown, can coordinate the position of a color wheel in a lamp module with the illumination of the red auxiliary light source 902. In an embodiment, the red auxiliary light source 902 is illuminated when a particular filter section of a color wheel is positioned in a light beam produced by a lamp.

In embodiments, auxiliary light module 901 can be used in conjunction with color wheel 500 or with color wheel 800. When used with a color wheel having a red filter, a projector can turn on red light source 902 when a red filter of the color wheel is positioned in a light beam from a primary light source.

Figure 10:
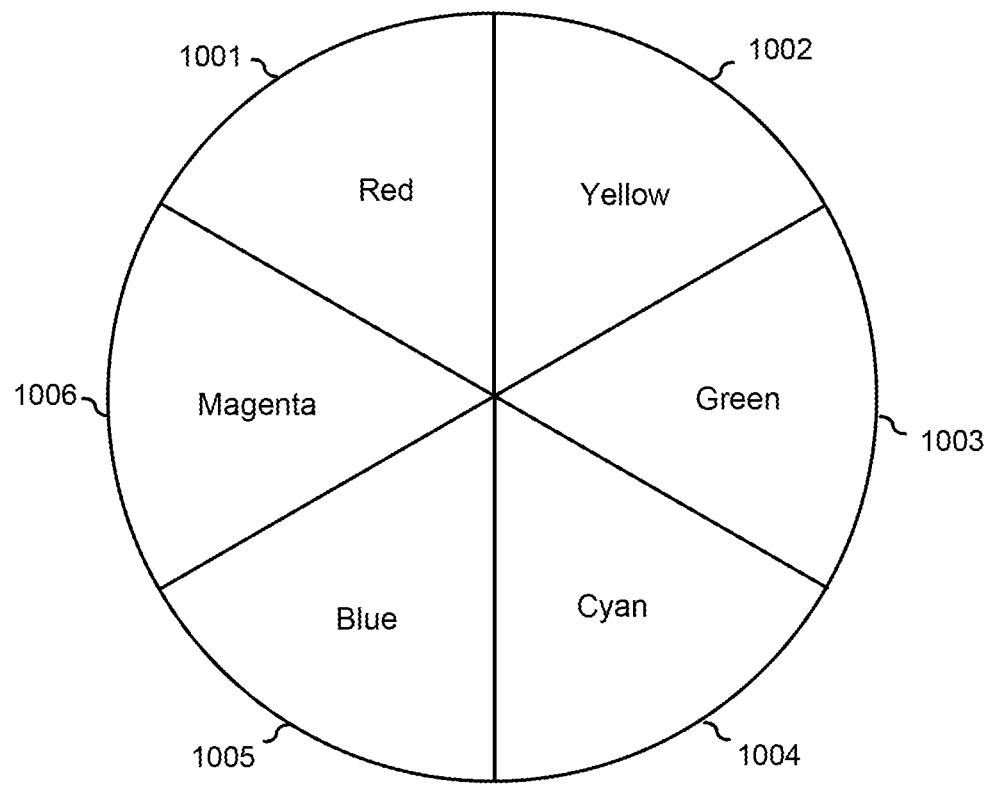
FIG. 10 is a diagram of a color wheel according to another embodiment of the present disclosure.

FIG. 10 shows a color wheel 1000 for use with a projector in an embodiment of the present disclosure. Color wheel 1000 includes primary color filter sections 1001, 1003 and 1005. Filter section 1001 is red, filter section 1003 is green and filter section 1005 is blue. Color wheel 1000 further includes secondary color filters 1002, 1004 and 1006. Filter section 1002 is yellow, filter section 1004 is cyan and filter section 1006 is magenta. Filter sections 1001-1006 reduce the intensity of wavelengths of light in particular ranges. In an embodiment, filter section 1002 can reduce the intensity of light having wavelengths outside of a range of 570 nm to 590 nm, corresponding to the color yellow. Although filter section 1002 can reduce the intensity of light within the range 570 nm to 590 nm, the reduction in intensity of light having wavelengths within the range is less than the reduction in intensity of light having wavelengths outside of the range. In an embodiment, filter section 1004 can reduce the intensity of light having wavelengths outside of a range of 490 nm to 520 nm. The range corresponds to the color cyan. Similar to filter section 1002, filter section 1004 primarily reduces the intensity of light outside the range. In an embodiment, filter section 1006 can reduce the intensity of light having wavelengths in the range of 500 nm to 590 nm. The range corresponds to green light. Reducing the intensity of green light in a white light beam produces the color magenta.

Figure 11:
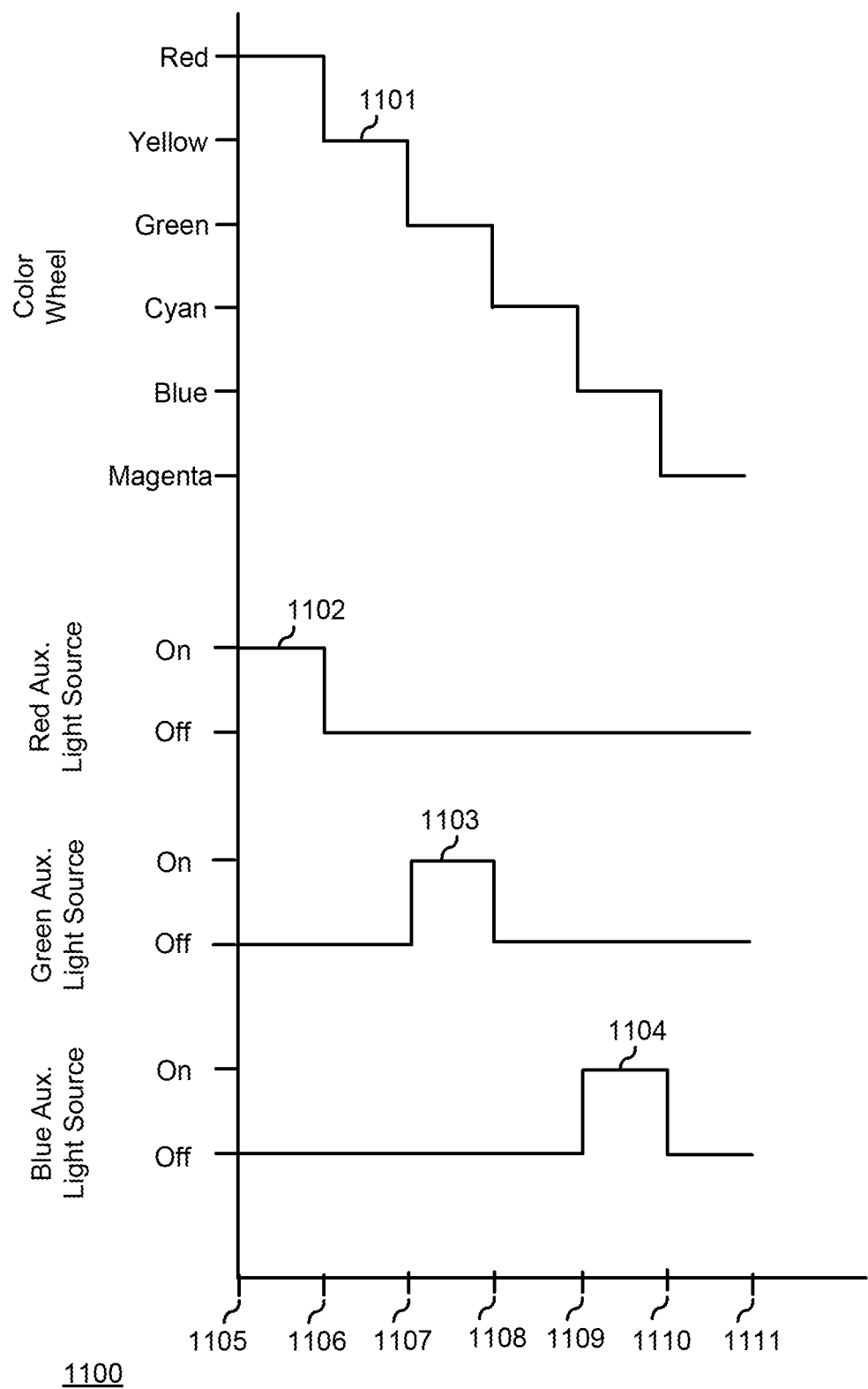
FIG. 11 is another timing diagram according to an embodiment of the present disclosure.

FIG. 11 shows timing diagram 1100, illustrating the coordination of color wheel 1000 with auxiliary light sources in a projector. The horizontal axis of timing diagram 1100 represents time. Timing curves 1101-1104 indicate the states of color wheel 1000 and of auxiliary light sources. Color wheel timing curve 1101 indicates which filter of filter sections 1001-1006 is positioned in the light beam from a lamp during a time interval. As color wheel 1000 rotates, the filter sections 1001-1006 are successively positioned into the light beam once on each rotation. Auxiliary light source timing curves 1102-1104 indicate the states of auxiliary light sources as on or off. At time 1105, filter section 1001 is positioned in a light beam from a lamp and a red auxiliary light source is turned on. Filter section 1001 is a red section thus light sent though an optical path to a spatial light modulator is a combination of light produced by the lamp and by the red auxiliary light source. At time 1106, filter section 1002 is positioned in the light beam and the red auxiliary light source is turned off. Filter section 1002 includes a yellow filter. Pixels in the final image that are to be yellow can be projected while filter section 1002 is positioned in the light beam from the lamp instead of being projected as a combination of red and green light as described with respect to color wheel 400. At time 1107, filter section 1003 is positioned in the light beam and a green auxiliary light source is turned on. Filter section 1003 is a green section. Thus, similarly to the operation of the projector using filter section 1001 and the red auxiliary light source, the light sent through the optical path is a combination of light produced by the lamp and light from the green auxiliary light source.

At time 1108, filter section 1004 is position in the light beam and the green auxiliary light source is turned off. Filter section 1004 is colored cyan. Cyan colored pixels can be projected using filter section 1004 instead of being projected as a combination of blue and green. At time 1109, blue filter section 1005 is positioned in the light beam and a blue auxiliary light source is turned on. At time 1110, magenta filter section 1006 is positioned in the light beam and the blue auxiliary light source is turned off. At time 1111, the color wheel 1000 has completed a revolution, red filter section 1001 is positioned in the light beam, the red auxiliary light source is turned on and the sequence repeats.

Skilled practitioners will appreciate that additional variations on filter color and auxiliary light source color can be constructed in accordance with the present disclosure. For example, in an embodiment a projector can augment only the color red. Such an embodiment can have color wheel 400 with only red auxiliary light source 312. Auxiliary light sources 313-314 can be omitted from the projector in such an embodiment. A projector can use auxiliary light sources to augment some or all of the primary colors of light produced by a lamp. The projector can also augment some or all of the secondary colors. For example, in a projector using color wheel 1000, a red auxiliary light source can be used to augment light from the lamp when a filter section of a secondary color containing red, such as magenta, is positioned in a light beam from the lamp. In an embodiment, light from auxiliary light sources can be combined with light having secondary colors produced by a lamp to adjust a white point of a projector.

Figure 12:
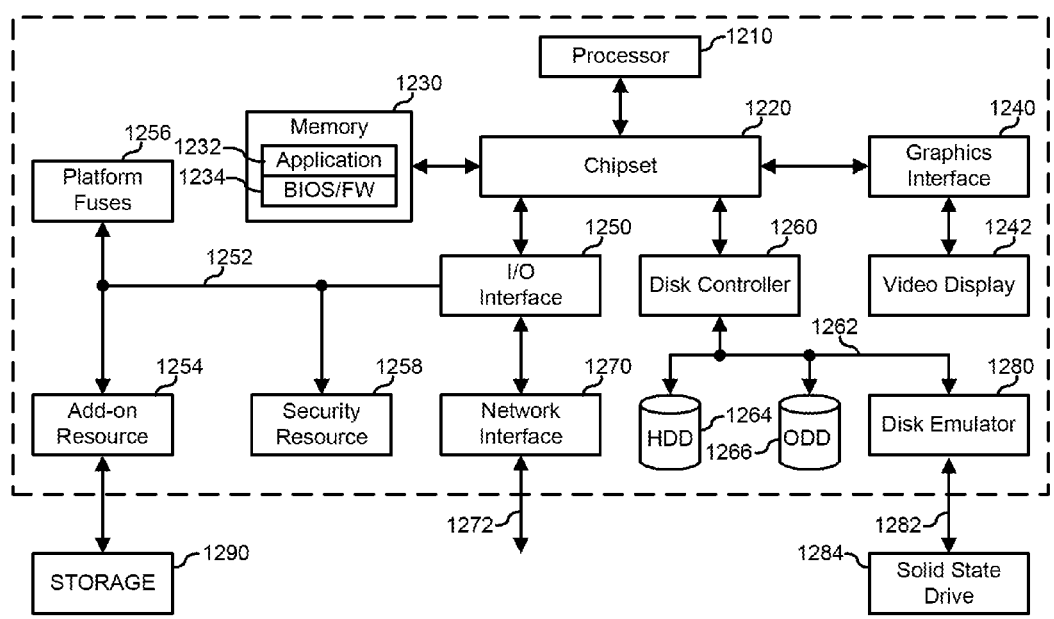
FIG. 12 is a diagram of an information handling system according to an embodiment of the present disclosure.

FIG. 12 is a block diagram illustrating an embodiment of an information handling system 1200, including a processor 1210, a chipset 1220, a memory 1230, a graphics interface 1240, an input/output (I/O) interface 1250, a disk controller 1260, a network interface 1270, and a disk emulator 1280. In a particular embodiment, information handling system 1200 is used to carry out one or more of the methods described herein. In another embodiment, one or more of the systems described herein are implemented in the form of information handling system 1200.

Chipset 1220 is connected to and supports processor 1210, allowing the processor to execute machine-executable code. In a particular embodiment, information handling system 1200 includes one or more additional processors, and chipset 1220 supports the multiple processors, allowing for simultaneous processing by each of the processors and permitting the exchange of information among the processors and the other elements of the information handling system. Chipset 1220 can be connected to processor 1210 via a unique channel, or via a bus that shares information among the processor, the chipset, and other elements of information handling system 1200.

Memory 1230 is connected to chipset 1220. Memory 1230 and chipset 1220 can be connected via a unique channel, or via a bus that shares information among the chipset, the memory, and other elements of information handling system 1200. In another embodiment (not illustrated), processor 1210 is connected to memory 1230 via a unique channel. In another embodiment (not illustrated), information handling system 1200 includes separate memory dedicated to each of the one or more additional processors. A non-limiting example of memory 1230 includes static random access memory (SRAM), dynamic random access memory (DRAM), non-volatile random access memory (NVRAM), read only memory (ROM), flash memory, another type of memory, or any combination thereof.

Graphics interface 1240 is connected to chipset 1220. Graphics interface 1240 and chipset 1220 can be connected via a unique channel, or via a bus that shares information among the chipset, the graphics interface, and other elements of information handling system 1200. Graphics interface 1240 is connected to a video display 1242. Other graphics interfaces (not illustrated) can also be used in addition to graphics interface 1240 as needed or desired. Video display 1242 includes one or more types of video displays, such as a flat panel display, another type of display device, or any combination thereof.

I/O interface 1250 is connected to chipset 1220. I/O interface 1250 and chipset 1220 can be connected via a unique channel, or via a bus that shares information among the chipset, the I/O interface, and other elements of information handling system 1200. Other I/O interfaces (not illustrated) can also be used in addition to I/O interface 1250 as needed or desired. I/O interface 1250 is connected via an I/O interface 1252 to one or more add-on resources 1254. Add-on resource 1254 is connected to a storage system 1290, and can also include another data storage system, a graphics interface, a network interface card (NIC), a sound/video processing card, another suitable add-on resource or any combination thereof. I/O interface 1250 is also connected via I/O interface 1252 to one or more platform fuses 1256 and to a security resource 1258. Platform fuses 1256 function to set or modify the functionality of information handling system 1200 in hardware. Security resource 1258 provides a secure cryptographic functionality and includes secure storage of cryptographic keys. A non-limiting example of security resource 1258 includes a Unified Security Hub (USH), a Trusted Platform Module (TPM), a General Purpose Encryption (GPE) engine, another security resource, or a combination thereof.

Disk controller 1260 is connected to chipset 1220. Disk controller 1260 and chipset 1220 can be connected via a unique channel, or via a bus that shares information among the chipset, the disk controller, and other elements of information handling system 1200. Other disk controllers (not illustrated) can also be used in addition to disk controller 1260 as needed or desired. Disk controller 1260 includes a disk interface 1262. Disk controller 1260 is connected to one or more disk drives via disk interface 1262. Such disk drives include a hard disk drive (HDD) 1264, and an optical disk drive (ODD) 1266, and can include one or more disk drive as needed or desired. ODD 1266 can include a Read/Write Compact Disk (R/W-CD), a Read/Write Digital Video Disk (R/W-DVD), a Read/Write mini Digital Video Disk (R/W mini-DVD), another type of optical disk drive, or any combination thereof. Additionally, disk controller 1260 is connected to disk emulator 1280. Disk emulator 1280 permits a solid-state drive 1284 to be coupled to information handling system 1200 via an external interface 1282. External interface 1282 can include industry standard busses such as USB or IEEE 1294 (Firewire) or proprietary busses, or any combination thereof. Alternatively, solid-state drive 1284 can be disposed within information handling system 1200.

Network interface device 1270 is connected to I/O interface 1250. Network interface 1270 and I/O interface 1250 can be coupled via a unique channel, or via a bus that shares information among the I/O interface, the network interface, and other elements of information handling system 1200. Other network interfaces (not illustrated) can also be used in addition to network interface 1270 as needed or desired. Network interface 1270 can be a network interface card (NIC) disposed within information handling system 1200, on a main circuit board such as a baseboard, a motherboard, or any combination thereof, integrated onto another component such as chipset 1220, in another suitable location, or any combination thereof. Network interface 1270 includes a network channel 1272 that provide interfaces between information handling system 1200 and other devices (not illustrated) that are external to information handling system 1200. Network interface 1270 can also include additional network channels (not illustrated).

Information handling system 1200 includes one or more application programs 1232, and Basic Input/Output System and Firmware (BIOS/FW) code 1234. BIOS/FW code 1234 functions to initialize information handling system 1200 on power up, to launch an operating system, and to manage input and output interactions between the operating system and the other elements of information handling system 1200. In a particular embodiment, application programs 1232 and BIOS/FW code 1234 reside in memory 1230, and include machine-executable code that is executed by processor 1210 to perform various functions of information handling system 1200. In another embodiment (not illustrated), application programs and BIOS/FW code reside in another storage medium of information handling system 1200. For example, application programs and BIOS/FW code can reside in HDD 1264, in a ROM (not illustrated) associated with information handling system 1200, in an option-ROM (not illustrated) associated with various devices of information handling system 1200, in storage system 1290, in a storage system (not illustrated) associated with network channel 1272, in another storage medium of information handling system 1200, or a combination thereof. Application programs 1232 and BIOS/FW code 1234 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A projector, comprising:
 a first light source producing a first light beam, the first light beam having light in a first range of wavelengths and having light in a second range of wavelengths, wherein
  the first range and the second range have no wavelengths in common;

a filter unit positioned in an optical path of the first light beam, wherein:
the filter unit is configured in a first configuration during a first time interval;
the filter unit is configured in a second configuration during a second time interval; and
the filter unit is configured in a third configuration during a third time interval;
a second light source producing a second light beam, wherein:
the second light beam includes light in a third range of wavelengths, and
the third range is not in the first range or in the second range; and
the second light source produces the second light beam only during the third time interval;
a first combiner positioned after the filter unit in the optical path, wherein the first combiner merges the second light beam into the first light beam; and
a second combiner positioned in the optical path to merge a third light beam into the first light beam.

2. The projector of claim 1, wherein an intensity of light produced by the second light source in the third range of wavelengths is greater than an intensity of light produced by the second light source not in the third range of wavelengths.

3. The projector of claim 1, wherein:
the first light beam further having light in the third range; and
the third configuration of the filter unit reduces the intensity of light not in the third range.

4. The projector of claim 1, the projector further comprising:
a spatial light modulator, wherein:
the first light beam is directed onto the spatial light modulator; and
the spatial light modulator selectively directs a portion of the first light beam through a projection lens.

5. The projector of claim 4, wherein the spatial light modulator includes movable mirrors.

6. The projector of claim 1, further comprising:
a third light source, wherein:
the third light source produces a third light beam, wherein the third light beam includes light in the first range of wavelengths;
an intensity of light produced by the third light source in the first range of wavelengths is greater than an intensity of light produced by the second light source in the second range of wavelengths; and
the third light source produces the third light beam only during the first time interval; and
the second combiner positioned after the filter unit in the optical path, wherein the first configuration reduces the intensity of light not in the first range.

7. The projector of claim 1, wherein:
the filter unit includes a color wheel, wherein:
the color wheel includes a plurality of filter sections; and
the color wheel rotates to position a particular filter section of the plurality of filter sections into the optical path of the first light beam;
the first configuration includes a first filter section of the plurality of filter sections being positioned in the optical path of the first light beam;
the second configuration includes a second filter section of the plurality of filter sections being positioned in the optical path of the first light beam; and
the third configuration includes a third filter section of the plurality of filter sections being positioned in the optical path of the first light beam.

8. The projector of claim 1, wherein the first light source includes a lamp.

9. The projector of claim 1, wherein the second light source includes a light emitting diode.

10. The projector of claim 1, wherein the second light source includes a laser diode.

11. An auxiliary projector light source, comprising:
an optical input accepting a first light beam, wherein the first light beam has a first spectrum during a first time interval and a second spectrum during a second time interval;
a first light source, wherein:
the first light source produces a second light beam having a third spectrum; and
the first light source produces the second light beam only during the first time interval;
a first beam combiner, wherein:
the first beam combiner is positioned an optical path of the first light beam; and
the first beam combiner merges the second light beam into the first light beam; and
an optical output in the optical path, wherein:
the first spectrum corresponds to a first color; and
the third spectrum corresponds to the first color.

12. The auxiliary projector light source of claim 11, further comprising:
a second light source, wherein:
the second light source produces a third light beam having a fourth spectrum; and
the second light source produces the fourth light beam only during the second time interval; and
a second beam combiner, wherein:
the second beam combiner is positioned in the optical path; and
the second beam combiner merges the third light beam into the first light beam.

13. The auxiliary projector light source of claim 12, wherein:
the first spectrum corresponds to a first color;
the third spectrum corresponds to the first color;
the second spectrum corresponds to a second color; and
the fourth spectrum corresponds to the second color.

14. An auxiliary projector light source, comprising:
an optical input accepting a first light beam, wherein the first light beam has a first spectrum during a first time interval and a second spectrum during a second time interval;
a first light source, wherein:
the first light source produces a second light beam having a third spectrum; and
the first light source produces the second light beam only during the first time interval;
a first beam combiner, wherein:
the first beam combiner is positioned an optical path of the first light beam; and
the first beam combiner merges the second light beam into the first light beam; and
an optical output in the optical path, wherein:
the first spectrum corresponds to a first color; and
the third spectrum corresponds to a second color.

15. The auxiliary projector light source of claim 14, further comprising:
    a second light source, wherein:
        the second light source produces a third light beam having a fourth spectrum; and
        the second light source produces the fourth light beam only during the second time interval; and
    a second beam combiner, wherein:
        the second beam combiner is positioned in the optical path; and
        the second beam combiner merges the third light beam into the first light beam.

16. The auxiliary projector light source of claim 14, wherein:
    the first spectrum corresponds to a first color;
    the third spectrum corresponds to the first color;
    the second spectrum corresponds to a second color; and
    the fourth spectrum corresponds to the second color.

\* \* \* \* \*